(No Model.)

C. A. GRANT.
VEHICLE AXLE.

No. 423,923. Patented Mar. 25, 1890.

Witnesses
E. Wurdeman
S. F. Riley

Inventor
Carrie A. Grant
By her Attorneys,
C. A. Snow & Co.

N. PETERS, Photo-Lithographer, Washington, D. C.

UNITED STATES PATENT OFFICE.

CARRIE A. GRANT, OF CAMBRIDGEPORT, MASSACHUSETTS.

VEHICLE-AXLE.

SPECIFICATION forming part of Letters Patent No. 423,923, dated March 25, 1890.

Application filed June 29, 1889. Serial No. 315,983. (No model.)

*To all whom it may concern:*

Be it known that I, CARRIE A. GRANT, a citizen of the Dominion of Canada, residing at Cambridgeport, in the county of Middlesex, and State of Massachusetts, have invented a new and useful Adjustable Bearing for Vehicle-Axles, of which the following is a specification.

The invention relates to improvements in adjustable bearings for vehicle-axles.

The object of the present invention is to provide an axle with conical bearings of simple and inexpensive construction which may readily be adjusted when the parts have become worn; and, furthermore, to provide a dust-cap that will be securely held in place by one of the cones.

The invention consists in the construction and novel combination and arrangement of parts, hereinafter fully described, illustrated in the accompanying drawings, and pointed out in the claims hereto appended.

Figure 1:
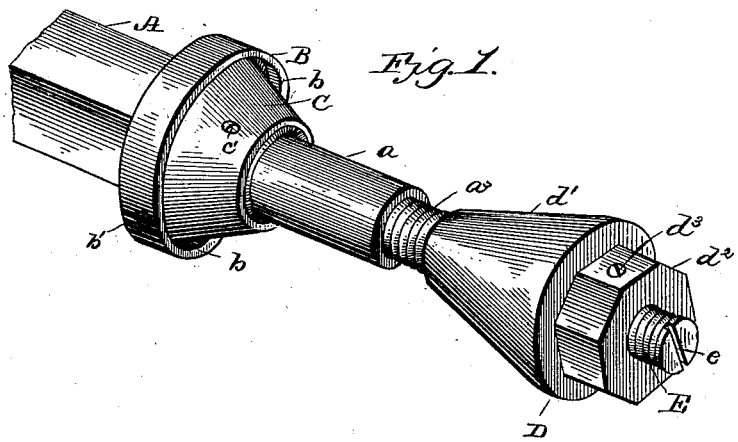
Figure 2:
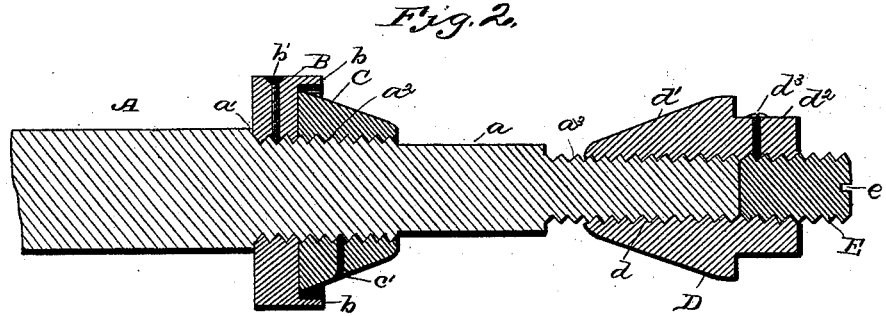

In the drawings, Figure 1 is a perspective view of an end of an axle provided with the improved bearings. Fig. 2 is a central longitudinal sectional view of the same.

Referring to the accompanying drawings by letter, A designates an axle having its spindle $a$ provided at its inner end near the shoulder $a'$ with a series of threads $a^2$, which are designed to receive the dust-cap B and the inner cone C, both of which parts have internal threads which engage the threads $a^2$, and the said cone C bears against the dust-cap B, within the flange $b$ and acts as a jam-nut to lock the parts together. The dust-cap B and cone C are provided, respectively, with the set-screws $b'$ and $c'$, which securely retain the parts in place. The flange $b$, projecting laterally from the dust-cap, engages the axle-box of a wheel and keeps the bearings free from dust and dirt.

The outer end of the spindle $a$ is reduced and provided with threads $a^3$, which engage the internal threads $d$ of the combined cone and nut D, which is advanced upon the threads $a^3$ as the parts become worn. The combined cone and nut D consists of the cone portion $d'$ and the nut $d^2$, which is formed integral with the cone portion $d'$, and the said combined cone and nut D is provided with an adjustable plug E to limit its advancement on the spindle $a$. The plug E is provided at one end with a recess $e$ to be engaged by a screw-driver to adjust the position of the plug, which may be operated from either end of the combined cone and nut. The plug may be squared and be operated by a wrench, and it preferably operated from the outer end of the combined cone and nut D. The latter is provided with a set-screw $d^3$ to engage the plug and hold the same.

From the foregoing description and the accompanying drawings the construction, operation, and advantages of the invention will readily be understood.

What I claim is—

1. The combination, with the axle having the outer end of its spindle threaded, of the combined cone and nut internally threaded and designed to be advanced upon the threaded end of the spindle, the plug E, arranged within the combined cone and nut and adapted to limit the advancement of the said nut and cone, and the set-screw $d^3$, substantially as described.

2. The combination of the axle having the inner and outer ends of its spindle $a$ threaded, the dust-cap engaging the inner threaded end of the spindle $a$, the inner cone C, bearing against the dust-cap and holding it in position against the shoulder of the axle, and the combined cone and nut D, having the plug E arranged within the same to limit its advancement upon the spindle, substantially as described.

In testimony that I claim the foregoing as my own I have hereto affixed my signature in presence of two witnesses.

CARRIE A. GRANT.

Witnesses:
M. E. ARCHIBALD,
E. J. LUTES.